United States Patent Office 3,365,659
Patented Jan. 23, 1968

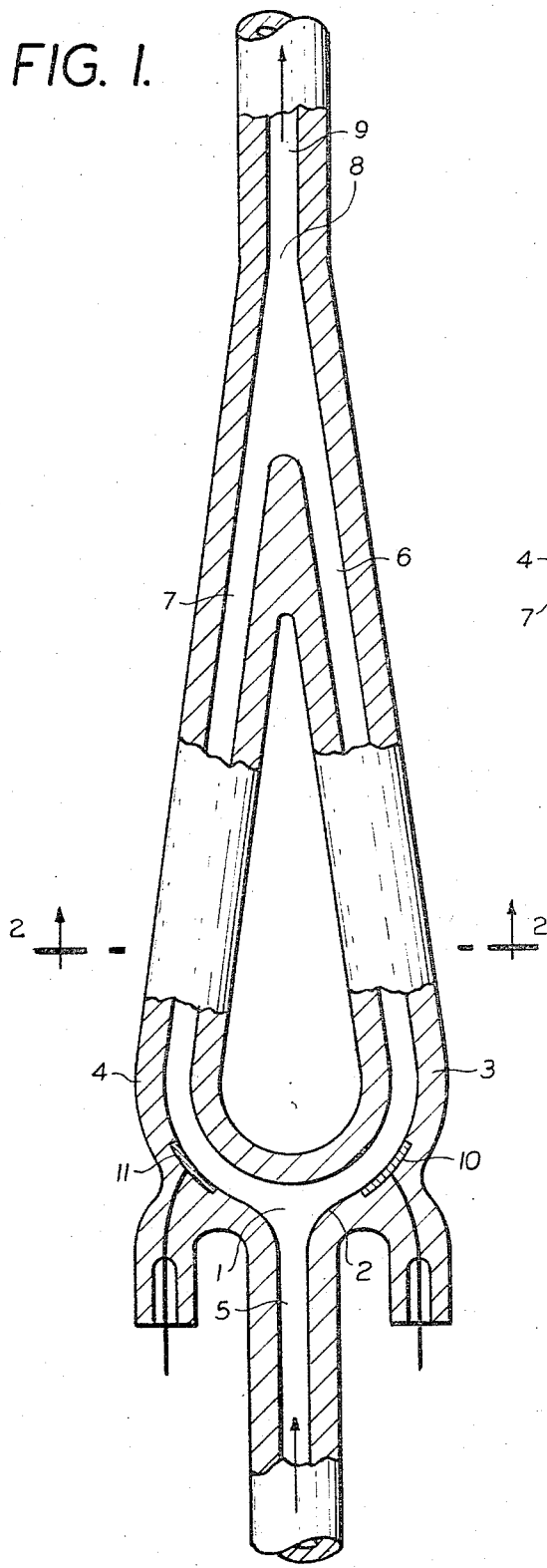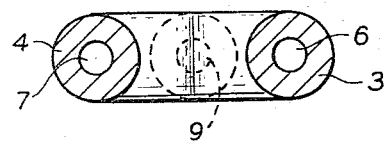

3,365,659
FLOW-THROUGH CONDUCTIVITY CELL
Wolfram Breuer, Leverkusen, Germany, assignor to Farbenfabriken Bayer Aktiengesellschaft, Leverkusen-Bayerwerk, Germany, a corporation of Germany
Continuation-in-part of application Ser. No. 253,455, Jan. 23, 1963. This application Mar. 6, 1967, Ser. No. 620,795
Claims priority, application Germany, Jan. 31, 1962, F 35,886
2 Claims. (Cl. 324—30)

ABSTRACT OF THE DISCLOSURE

This invention relates to a device for the measurement of the conductivity of liquids. It more particularly refers to such a device which is adapted to be used with a liquid having phase inconsistencies, i.e., bubbles or solid matter, therein.

This specification discloses a device comprising a U tube having an inlet take in to the base thereof and two outlet tubes each extending from one arm respectively thereof. The outlet tubes join together above the U tube into a single exit tube. The device is utilized in a vertical position with the inlet tube at the lowest point and the exit tube at the highest point. The U tube and other portions of this device are so constructed that no internal surfaces thereof are horizontal or downwardly directed in the direction of the flow of liquid therethrough. Electrodes are positioned on the inside walls of the U-tube base on each side thereof separated by the inlet tube communication. These electrodes contact the fluid being tested.

---

This application is a continuation-in-part of Application Ser. No. 253,455, filed Jan. 23, 1963, now abandoned.

In order to determine the electrical conductivity of liquids, cells having two or more electrodes are used. From the electrical resistivity and the cell constant, it is possible to calculate the specific conductivity of the solution in the cell. For continuous measurement, measuring cells through which the solution flows are used. For small liquid flows, use is made of microcells having the smallest possible volume. Such microcells always have the disadvantage that any bubbles or particles of dirt which occur in the solution remain adhering at the changes in cross-section of the cell caused by the electrodes and impair the measurement. In particular, precision measurements which, because the conductivity is greatly dependent on the temperature, necessitate a heat treatment, are severely impaired by the gas bubbles which form on heating. Using the conventional flowthrough microcells, conductivity measurement cannot be carried out with the accuracy which is necessary, for example, as in meters for continuously measuring traces of gas with a chemical auxiliary reaction.

It is therefore an object of this invention to provide a conductivity measuring cell which is not subject to the disadvantages of prior art cells.

It is another object of this invention to provide a conductivity measuring cell capable of measuring the conductivity of liquids which have gas bubbles or solid matter such as dirt particles therein.

Other and additional objects of this invention will become apparent from a consideration of this entire specification including the claims and drawing appended hereto.

In accord with and fulfilling these objects, one aspect of this invention includes a device comprising a U tube having an inlet tube into the base thereof; an outlet tube extending from each arm of said U tube; and an exit tube attached to both of said outlet tubes. Two electrodes are positioned inside the cell in operative association with the fluid being tested. Each electrode is mounted on the inside of the base of the U tube on either side of the point in the base where the inlet tube communicates with the U tube. The device of this invention operates in a vertical position with the inlet tube being the lowest point and the exit tube being the highest point.

Understanding of this invention will be facilitated by reference to the accompanying drawing in which:

FIG. 1 front elevation partially in section of a device in accord with this invention; and FIG. 2 is a sectional view along the line 2—2 in FIG. 1 looking in the direction of the arrows.

Referring now to this drawing, a U tube 1 having a base 2 and two arms 3 and 4 is provided with an inlet tube 5 into the base 2 thereof and two outlet tubes 6 and 7 extending from the arms 3 and 4 respectively thereof. The outlet tubes 6 and 7 join together at a junction 8 to form a single exit tube 9. Electrodes 10 and 11 are provided on the inside surface of the U-tube base 2 disposed on either side of the point where the inlet tube 5 enters the U tube 1.

In accord with this invention, the device hereof may be made of a single continuous member as shown in the drawing with various portions of this single member having the shape and serving the functions set forth. In the alternative, some or all of the device described may be made up of individual members joined together in the relationship described in a conventional manner.

The cell of this invention is designed and utilized in such manner that the inside walls thereof are all upwardly sloping in the direction of movement of the liquid passing through the cell for analysis.

Gas bubbles entering the cell move on to the inner curve of the U tube because of their buoyancy and the liquid flow, and slide outwardly thereon until they can ascent freely in the slightly sloped arms through the outlet tube to the exit tube. This movement outwards is a consequence of the labile equilibrium of the gas bubbles. With increasing displacement outwardly, the lifting component in the direction of movement becomes greater. Gas bubbles forming in the cell experience the same movement. Bubbles which form on the electrodes rise without any hindrance. Due to the particular shaping, the flow cross-section of the cell is doubled by comparison with a simple tube, but the electrical constant of the cell is not substantially reduced. In millimeters, the inside diameter of the tube can be 1.5; the distance between inlet and outlet can be 30 mm.; the electrodes can be about 5 mm. above the inlet; the tubing can have an outside diameter of 6 mm. and the width of the band at the widest point can be 20 mm. The electrodes can be platinum.

This microcell is particularly suitable for use in automatic gas analysis for operation with readily degasifying reaction solutions.

The tubes and other portions of the device of this invention may have substantially any cross-sectional shape desired. It is preferred that the inside cross-section of the tubes are smooth curves. For economic reasons, these tubes are most desirably round in internal cross-section. The tubes may be made of substantially any substantially electrically insulating material, preferably glass, which is substantially inert to the liquid being passed therethrough as well as to all phase inconsistencies in said liquid.

What is claimed is:

1. A conductivity measuring cell for measuring the conductivity of a flowing fluid stream, comprising a hollow U tube having an inlet tube extending from the base thereof, a tube generally symmetrically extending from each arm of said U tube, which symmetrically join together into a top outlet tube, which outlet tube is the member of said cell most remote from said U tube base, and electrodes adjacent to and on each side of said inlet member of said cell most remote from said U-tube base, such as to have an exposed contact surface in said U tube, which electrode surfaces are adapted to be operatively associated with a test fluid adapted to be passed through said U tube, wherein the passageways of said U tube, the tubes extending therefrom, said outlet tube and said inlet tube communicate with each other; wherein each extension tube and the U tube passageway connected thereto are aligned and have a common axis at least at their point of interconnection; and when said cell is positioned with said inlet tube as the lowermost member and said outlet tube as the uppermost member, all points on the surfaces of all of said tubes are positioned such that the next adjacent downstream point thereon is at a greater elevation than said point.

2. A cell as claimed in claim 1, wherein the internal cross-sections of the members thereof are substantially round.

References Cited
UNITED STATES PATENTS 2,640,870   6/1953   Seitz _____ 324—3

RUDOLPH V. ROLINEC, *Primary Examiner.*
C. F. ROBERTS, *Assistant Examiner.*